June 30, 1953     G. A. LYON     2,643,910
TOP SHIELD FOR AUTOMOBILES
Filed Oct. 22, 1949
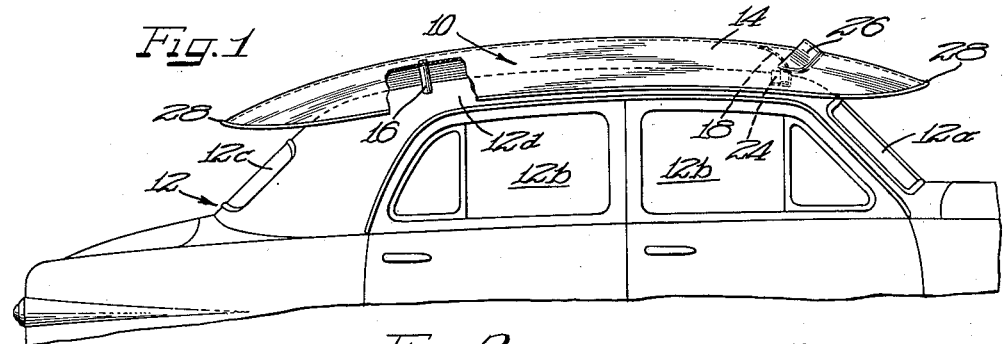
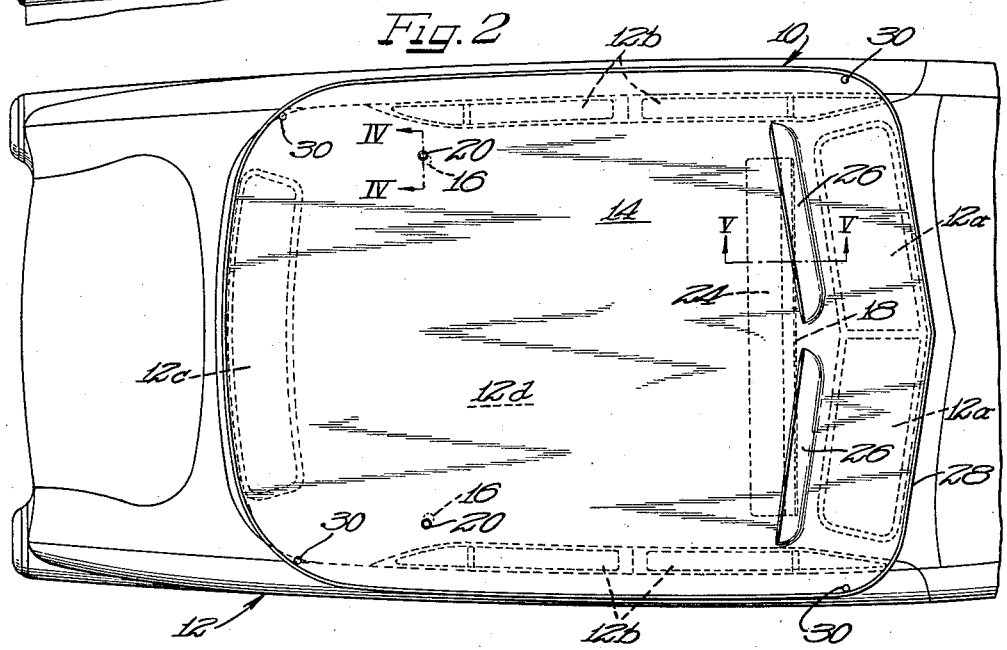
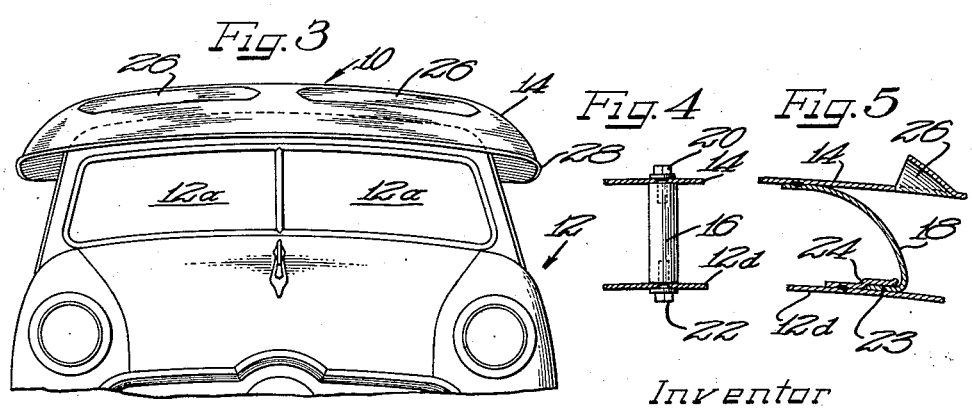
*Inventor*
*George Albert Lyon*
by *Hro Pirm of Charles W. Hills*
         *Attys*

Patented June 30, 1953

2,643,910

UNITED STATES PATENT OFFICE 2,643,910

TOP SHIELD FOR AUTOMOBILES

George Albert Lyon, Detroit, Mich.

Application October 22, 1949, Serial No. 122,992

8 Claims. (Cl. 296—95)

This invention relates to a shield panel structure which may be readily mounted over the roof of a vehicle, such as an automobile, truck, boat or the like.

The shield has particular utility as a deflector of the sun's rays which would ordinarily bear on the top of the vehicle and cause heat discomfort to the passengers therein. The shield also provides visor structure for the windowed portions of the vehicle body and shields the windowed portions from the sun's rays, rain, sleet, snow and the like.

It is a present day trend in automobile design to have the body of the vehicle along low, sweeping, curved streamlined contours. To create customer appeal in the designs, it is customary to paint the vehicle body in colors having poor heat or light reflectant characteristics.

Automobile and other vehicle bodies designed in keeping with these trends have been subject to certain inherent disadvantages. The streamlined construction exposes the windowed portions, particularly front and rear of the body to more direct overhead rays of the sun. The windowed areas of the vehicle body are likewise unduly exposed to rain, sleet, snow and the like.

Accordingly, it is an object of this invention to provide an improved top sun ray and weather shield for automotive vehicles and the like.

Another object of this invention is to provide an improved top shield for vehicles which may be readily mounted on or removed from the roof of the vehicle.

Another object of this invention is to provide an improved top shield for vehicles which will provide a sun and weather visor for the windowed portions of the vehicle body.

According to the general features of the present invention there is provided in a vehicle including a body having a windshield and a roof, a top shield overlying said roof in spaced relation thereto and having a portion projecting forwardly as a visor overhanging the windshield, the shield having an opening behind the visor portion to pass air over the top of the shield.

In further accord with the general features of the invention the shield is secured in spaced relation to the roof of the automobile by a pair of posts rearwardly of the transverse center line of the shield and by a transverse depending element at the forward portion of the shield rearwardly of said opening which serves also as a baffle to direct the air through the opening.

Other objects, features and advantages of this invention will be more fully apparent from the following detailed description taken in conjunction with the accompanying drawings which illustrate one embodiment thereof, and in which:

Figure 1 is a fragmentary side elevational view of an automobile upon the roof of which there has been mounted a top shield constructed in accordance with the features of this invention;

Figure 2 is a fragmentary top plan view of the automobile and shield;

Figure 3 is a front view of the automobile and the attached shield;

Figure 4 is a detail sectional view showing one of the posts securing the top shield and taken substantially along the line IV—IV of Figure 2; and Figure 5 is a transverse sectional view in detail of the front securing member or baffle taken substantially along the line V—V of Figure 2.

In accordance with the teachings of the present invention, a top shield 10 is shown in the drawing as mounted upon an existing automobile 12. The shield 10 comprises a top panel 14 of generally turtle-back-like configuration which slopes downwardly and outwardly toward its peripheral margin so as to overhang the front window 12a, the four side windows 12b, and the rear window 12c of the automobile 12.

The roof 12d of the automobile 12 is designed in the curved, sweeping streamline contours currently popular for automobile construction and the panel 14 of the top construction 10 is substantially complementary in contour to the top 12d but is maintained in spaced relation thereto by a pair of posts or studs 16 disposed rearwardly of the transverse center line of the top 12d and by a transverse retaining brace and baffle element 18 which is disposed adjacent to but spaced rearwardly from the front end of the panel 14. It is particularly advantageous to maintain the shield panel 14 in spaced relation to the roof 12d so that the overhanging portion of the shield 14 will provide wider shade and shielding area to the windowed portions 12a, 12b and 12c.

The studs or posts 16 are of cylindrical construction and tapped at each end to receive bolts 20 passing through suitable apertures in the shield panel 14 and the retaining bolts 22 passing through suitable apertures in the automobile roof panel 12d.

The brace 18 is secured to the lower surface of the forward portion of the panel as by welding. The lower end of the brace 18 is turned inwardly to provide a retaining flange 23 interengageable with a retaining clip or flange strip 24 transversely secured as by welding to the top 12d of the car, preferably immediately back of the top of the windshield structure 12a.

The brace 18 also serves as a baffle to the passage of air over the top of the car, directing the air upwardly through transversely elongated openings defined by one or a pair of louvers 26 in the panel 14 adjacent and above the split windshield 12a and forwardly of the brace 18. The baffling of the air over the top of the shield panel 14 tends to cool the shield 10 and avoids wind resistance under the forward visor portion of the shield.

An upwardly curled edge 28 is provided about the margin of the top panel 14, the curl being open in an upward direction to provide a gutter for collecting and draining run off moisture from the top panel 14. A plurality of drain holes 30 are provided at spaced intervals about the periphery of the top panel 14 in the gutter provided by the curled edge 28. The moisture drain holes 30 may be located only at the front and rear ends of the panel 14 to drain the moisture insofar as in keeping with the turtle-back configuration of the panel 14. The gutter slopes downwardly toward the front and rear portions of the panel.

The shield construction provided by the top panel 14 may be readily assembled on the roof of the automobile by placing the front brace and baffle 18 within the clip secured to the roof of the automobile and thereafter securing the rear portion of the top panel to the roof 12d of the automobile through the medium of the parts 16. After assembly, the panel protectively overhangs the windowed portions of the automobile body, shielding those portions from sun rays and providing an eaves construction as a shelter for these portions during the fall of rain, snow, sleet and the like. The shield may be easily disassembled and removed for storage but is secured firmly against inadvertent displacement during operation of the automobile by the aforedescribed securing means. The chances of the shield being "blown off" during operation of the automobile are further lessened by baffling the air through the louvres rather than to allow all of the air to move beneath the turtle-back shield.

It will be understood that modifications and variations may be effected without departing from the scope of the novel concepts of the present invention.

I claim as my invention:

1. In a roof construction for an automobile having a body comprising front, side and rear windowed walls and a roof panel, a turtle-back-like shield constructed to protectively overhang said windowed walls, front and rear securing means adapted to be disposed between said roof panel and said shield to secure said shield in spaced relation to said roof panel, baffle means defined by said front securing means to baffle air from beneath said shield upwardly, and means defining an opening above and forwardly of the baffle means.

2. In a top construction for a vehicle having a body comprising substantially upright front, side and rear windowed walls and a top panel integrally joining said upright walls, a shield of substantially turtle-back-like configuration adapted to overhang said walls, a plurality of posts adapted to be secured to the top panel of the body and to said shield rearwardly of the center line of the shield to support the rear portion of said shield in spaced relation to the top, a transverse supporting and retaining structure for securing said shield to said top adjacent the front end thereof to maintain the front end of the shield in spaced relation to the top, baffle means defined by said supporting and retaining structure to deflect air upwardly, and air passage louvre means on said shield above said baffle means.

3. A shield construction for attachment to the top of a vehicle, comprising a panel of generally turtle-back configuration adapted to overlie the roof of the vehicle and having outwardly extending marginal portion providing a visor structure for the walls of the vehicle, forward and rear mounting means for securing said panel in spaced relation to the roof of the vehicle, said forward mounting means providing an air baffle for the front visor portion of said marginal portion, air passage louvre means on said panel adjacent and above said forward mounting means, and an upwardly curled open edge on said panel to provide a gutter for said panel.

4. A shield construction for attachment to the top of a vehicle, comprising a panel of generally turtle-back configuration adapted to overlie the roof of the vehicle and having outwardly extending marginal portion providing a visor structure for the walls of the vehicle, forward and rear mounting means for securing said panel in spaced relation to the roof of the vehicle, said forward mounting means providing an air baffle for the front visor portion of said marginal portion, air passage louvre means on said panel adjacent and above said forward mounting means, an upwardly curled open edge on said panel to provide a gutter for said panel, and means on said gutter providing a drain.

5. In a top shield for a vehicle, a panel, means for supporting the rear portion of the panel in spaced relation to the top of a vehicle, means at the forward portion of the panel providing a front visor and defining an air slot back of the visor, and means back of said air slot extending downwardly for attachment to the top of the vehicle and serving as a baffle to compel movement of air upwardly through said slot in the forward movement of the vehicle.

6. In a roof construction for an automobile having a body comprising front, side and rear windowed walls and a roof panel, a turtle-back like shield constructed to protectively overhang said windowed walls, front and rear securing means adapted to be disposed between said roof panel and said shield to secure said shield in spaced relation to said roof panel, said front securing means providing baffle means elongated generally transversely of the shield and extending downwardly and forwardly in limited spaced relation back of the front edge of the shield, and said shield having above and forwardly of the baffle means a generally transversely elongated opening through which air is adapted to be deflected by the baffle means in the forward movement of the shield on an automobile.

7. In a roof construction for an automobile having a body comprising front, side and rear windowed walls and a roof panel, a turtle-back like shield constructed to protectively overhang said windowed walls, front and rear securing means adapted to be disposed between said roof panel and said shield to secure said shield in spaced relation to said roof panel, said front securing means providing baffle means elongated generally transversely of the shield and extending downwardly and forwardly in limited spaced relation back of the front edge of the shield, and said shield having a pair of generally transversely elongated openings in the forward portion thereof above and forwardly of the baffle means through which air is adapted to be deflected by the baffle means in the forward movement of the shield on an automobile, said openings having adjacent ends spaced apart transversely of the shield and separated by a solid portion of the shield.

8. In a roof construction for an automobile having a body comprising front, side and rear windowed walls and a roof panel, a turtle-back like shield constructed to protectively overhang said windowed walls, front and rear securing means adapted to be disposed between said roof panel and said shield to secure said shield in spaced relation to said roof panel, said front securing means providing baffle bracket structure elongated generally transversely of the shield and extending downwardly and forwardly in limited spaced relation back of the front edge of the shield, said bracket structure having an angular flange along the bottom margin thereof, a flange strip adapted to be secured to the roof panel of the automobile and having a portion thereof providing a socket elongated transversely of the shield within which said bracket structure flange is adapted to be retainingly engaged, and said shield having above and forwardly of the baffle bracket structure an opening through which air is adapted to be deflected by the baffle bracket structure in the forward movement of the shield on an automobile.

GEORGE ALBERT LYON.

References Cited in the file of this patent

UNITED STATES PATENTS

| Number | Name | Date |
| --- | --- | --- |
| 1,543,877 | Saunders | June 30, 1925 |
| 2,231,293 | Norman | Feb. 11, 1941 |
| 2,318,143 | Cutting | May 4, 1943 |
| 2,496,085 | Engelheart | Jan. 31, 1950 |
| 2,554,176 | Edwards | May 22, 1951 |